US006273839B1

United States Patent
Dutson

(10) Patent No.: US 6,273,839 B1
(45) Date of Patent: Aug. 14, 2001

(54) ROLLER CONTROL UNIT FOR A CONTINUOUSLY-VARIABLE-RATIO TRANSMISSION

(75) Inventor: Brian Joseph Dutson, Manchester (GB)

(73) Assignee: Torotrak (Development) Limited, Lancashire (GB)

(*) Notice: Subject to any disclaimer, the term of this patent is extended or adjusted under 35 U.S.C. 154(b) by 0 days.

(21) Appl. No.: 09/660,512

(22) Filed: Sep. 12, 2000

Related U.S. Application Data

(63) Continuation of application No. PCT/GB99/00826, filed on Mar. 17, 1999.

(30) Foreign Application Priority Data

Apr. 24, 1998 (GB) .................................................. 9808622

(51) Int. Cl.[7] ............................. F16H 57/04; F16H 15/38
(52) U.S. Cl. ............................... 476/8; 92/52; 92/117 R; 476/10; 476/14; 476/42
(58) Field of Search ............................ 92/51, 52, 53, 92/117 R; 476/8, 9, 10, 14, 42

(56) References Cited

U.S. PATENT DOCUMENTS 3,828,618 * 8/1974 Sharpe et al. ................ 476/10 X
5,072,811 * 12/1991 Everhard ...................... 92/51 X
5,564,993 * 10/1996 Robinson ...................... 476/10
5,971,885 * 10/1999 Greenwood et al. ............. 476/8
5,971,886 * 10/1999 Yamamoto ..................... 476/10
5,989,150 * 11/1999 Yamamoto ..................... 476/8

FOREIGN PATENT DOCUMENTS

| 27 09 514 | 9/1978 | (DE) . |
| 0 356 780 | 3/1990 | (EP) . |
| 1287259 | 8/1972 | (GB) . |
| 2 282 196 | 3/1995 | (GB) . |
| WO 90/05860 | 5/1990 | (WO) . |

* cited by examiner

Primary Examiner—Allan D. Herrmann
(74) Attorney, Agent, or Firm—Nixon & Vanderhye P.C.

(57) ABSTRACT

A roller control unit (2) for a continuously-variable-ratio transmission includes a cylinder (6) having a cylinder wall and an end wall; and a piston (8), within the cylinder (6) and to which the roller assembly (4) is connected for movement therewith, said unit includes an axially extending shroud (10) of variable length extending between the piston (8) and the end wall, thereby to define in combination with the piston (8) and cylinder (6) a chamber (16) for receiving hydraulic fluid, and in which the shroud (10) comprises a telescopic shroud which in a first position of the piston (8) is extended and in a second position of the piston (8) is retracted.

9 Claims, 3 Drawing Sheets

ROLLER CONTROL UNIT FOR A CONTINUOUSLY-VARIABLE-RATIO TRANSMISSION

This Appln is a con't of PCT/GB99/00826 filed Mar. 17, 1999.

BACKGROUND OF THE INVENTION

1. Field of the Invention

This invention relates to continuously-variable-ratio transmissions ("CVT's") of the toroidal-race rolling-traction type, and in particular to roller-control units of the kind by which the orientation of the traction-transmitting rollers may be controlled hydraulically, by means of the direct connection of the carriage of each roller to a piston, movable within a hydraulic cylinder connected to a controlled source of variable fluid pressure.

2. Discussion of Prior Art

Several patent publications of recent years, of which WO90/05860 is an example, describe toroidal-race transmissions in which direct connection of each roller to a piston subject to controlled hydraulic pressure suffices to maintain the angular orientation of each roller—and thus the ratio transmitted by it from an input disc—at the appropriate value at all times. The key to the efficacy of such an apparently simple method of roller control is that for any given combination of the essential parameters (operator demand, engine load and speed, final output speed etc.,) of the complete driveline of which the CVT is part, for each angular orientation that each roller may take up within its possible range of such orientations there will be a unique torque loading to which the roller will be subjected. A control system receives inputs representative of all the essential parameters, and sets up within the cylinder the appropriate hydraulic pressure to match the torque reaction associated with the desired orientation, so causing the roller to seek and hold that orientation.

One of the problems encountered in practice by CVT's, in which rollers are so controlled is that the length of the stroke that the piston must execute in order fully to control the roller is relatively long. Consequently, the housing for the piston/cylinder is of such a length that it can be difficult to install within the tight confines of, for example, an engine compartment.

SUMMARY OF THE INVENTION

It is an object of the present invention to provide a roller control unit for a continuously-variable-transmission of the toroidal-race rolling-traction type which at least reduces the above-mentioned problem.

Accordingly, the present invention provides a roller control unit for a continuously-variable-ration transmission of the toroidal-race rolling traction type, said roller control unit comprising:
  a cylinder, having a cylinder wall and an end wall;
  a piston, within the cylinder and to which the roller is connected for movement therewith; characterised by an axially extending shroud of variable length extending between the piston and the end wall, thereby to define in combination with the piston and cylinder a chamber for receiving hydraulic fluid, and in which the shroud comprises a telescopic shroud which in a first position of the piston is extended and in a second position of the piston is retracted.

Advantageously, the shroud comprises two or more axially extending tube sections, each section being slidable over the other between said first and second positions.

Preferably, said tube sections include endstops for engagement with corresponding endstops on an adjacent telescopic portion when in said fully extended position.

In one arrangement a first of said telescopic portions comprises an extension of the piston.

Advantageously, a second of said telescopic portions has at an end remote from said first telescopic portion an end stop for engagement with an end stop fixed relative to the cylinder.

Said cylinder may include an extension portion over which, in operation, said telescopic portion slides.

Advantageously, said end stop fixed relative to the cylinder comprises an end stop formed by or on said extension portion.

In one preferred arrangement the piston comprises a double action piston and the assembly includes a second shroud member extending between the piston and a second end wall of the cylinder, thereby to define a second hydraulic chamber for receiving hydraulic fluid.

Conveniently, one or more of said end stops comprises a circlip.

BRIEF DESCRIPTION OF THE DRAWINGS

The present invention will now be more particularly described by way of example only with reference to the accompanying drawings, in which.

DETAILED DISCUSSION OF PREFERRED EMBODIMENTS

Figure 1:
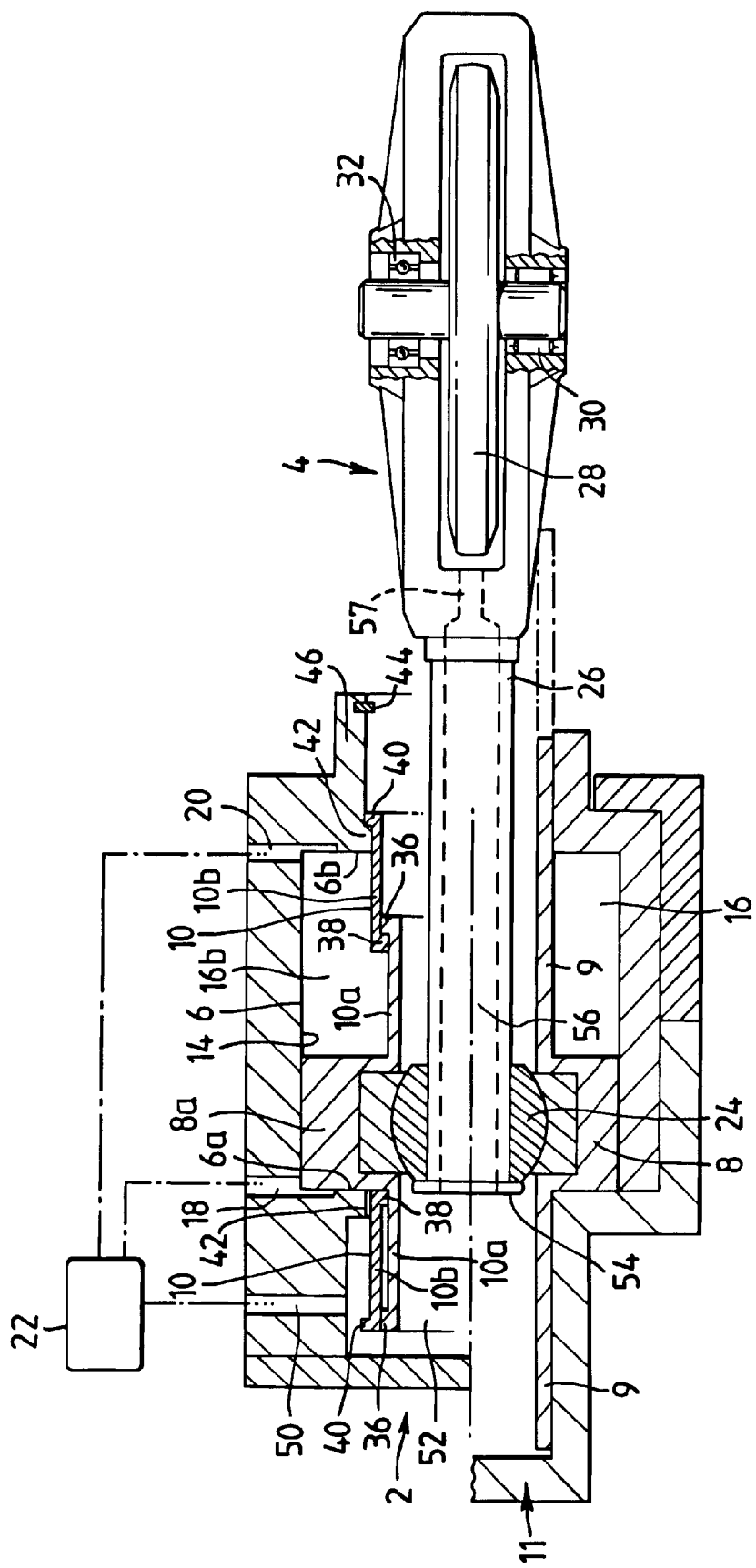
FIG. 1 is a schematic split cross-sectional view of a roller-control unit according to the invention, contrasted with a prior art arrangement.

Referring to FIG. 1, there is shown a roller-control unit 2 comprising an hydraulic piston/cylinder unit coupled to an associated roller 4. The lower part of the roller control unit 2 is shown diagrammatically as a known type of unit whereas the upper part portrays the present invention. The lower portion includes a piston 8 having axially extending portions 9 which act to define one boundary of a hydraulic chamber for receiving hydraulic piston control fluid. It will be appreciated that portions 9 must be sufficiently long as to ensure that they maintain contact with the cylinder at both extremes of the piston travel. Consequently, portions 9 protrude from the roller unit for a significant distance in order to accommodate the movement of the piston and the housing 11 in which the unit is housed is, by necessity, somewhat larger than might be desired.

Referring now to the upper part of FIG. 1, a roller control unit 2 according to the present invention includes a cylinder 6 which receives a piston 8 comprising a central head portion 8a and cylindrical shrouds shown generally at 10 and which extends axially on either side of head portion 8a. The shrouds 10 comprise a first portion 10a formed, for example, as an extension of the piston that make sliding and sealing contact with further shroud portions 10b which similarly extend axially along the cylinder 6 and are themselves in sealed sliding contact with an end portion 6a, 6b of the cylinder 6.

Head portion 8a makes sliding contact with the cylinder wall 14 and is moveable therealong in a manner to be described later herein. The shroud or shrouds 10 define in combination with the piston 8 and cylinder 6 a chamber or chambers 16 for receiving hydraulic fluid used to move the piston and roller assembly. In the particular example shown the piston 8 comprises a double acting piston having a chamber 16a, 16b formed on either side of the piston 8 and having two shrouds 10, one on either side of the piston 8, each of which is as described above. The two chambers thus formed include supply ducts 18, 20 for receiving hydraulic actuation fluid under pressure from a source thereof shown schematically at 22. The source includes fluid at different pressures P1, P2 and actuation of the piston 8 is achieved by controlling the pressures within the chambers 16a, 16b in a manner well known to those skilled in the art and therefore not described further herein. The piston carries a self aligning bearing 24 which supports a spindle 26 which in turn extends to roller unit 4, to which it is rigidly connected in order to move roller unit 4 as and when required. Roller unit 4 contains a roller 28 mounted in bearings 30, 32 as is well known in the art.

Returning now to the shroud 10, it will be seen that portion 10a has an upstanding boss portion or end stop 36. Second portion 10b is of approximately the same length as portion 10a and is arranged to slide over portion 10a, portion 10b having at its inner end an inwardly extending boss or end stop 38 arranged to co-operate with end stop 36 of shroud portion 10a and has on its outer end an outwardly extending boss or end stop 40 arranged to co-operate with an inwardly extending boss portion or end stop 42 fixed relative to the cylinder 6. A final end stop 44 is provided on an extension portion 46 at one end of the cylinder 6 and this acts to prevent the shroud portion 10b from protruding too far into the area of roller operation. For convenience, this end stop may comprise a simple circlip as shown.

Comparing the upper and lower portions of FIG. 1 it may be seen that whereas the length of item 9 and the total length of shroud 10 are the same, permitting the piston head 8a the same range of movement (and hence providing the roller assembly with the same range of movement), nevertheless the overall length of housing 11 is significantly reduced. This is because as the piston head 8a moves from one side of the cavity to the other under the action of differential pressure applied through ports 18, 20, telescopic shroud portions 10a, 10b on both sides of the head portion slide one within the other to define the cavity 16 for application of fluid pressure, but permitting collapse one upon the other of those shroud portions which are not operative.

Figure 2:
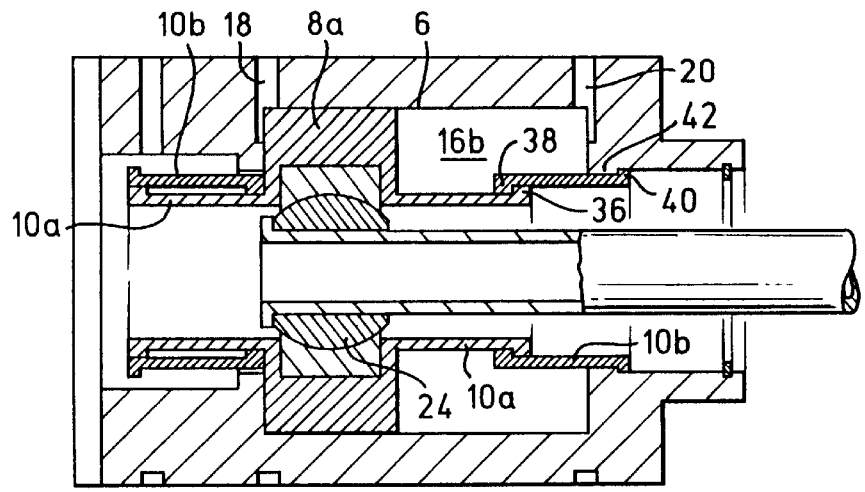
FIGS. 2–4 are cross-sectional views of the roller-control unit of the present invention in various operating positions.
Figure 3:
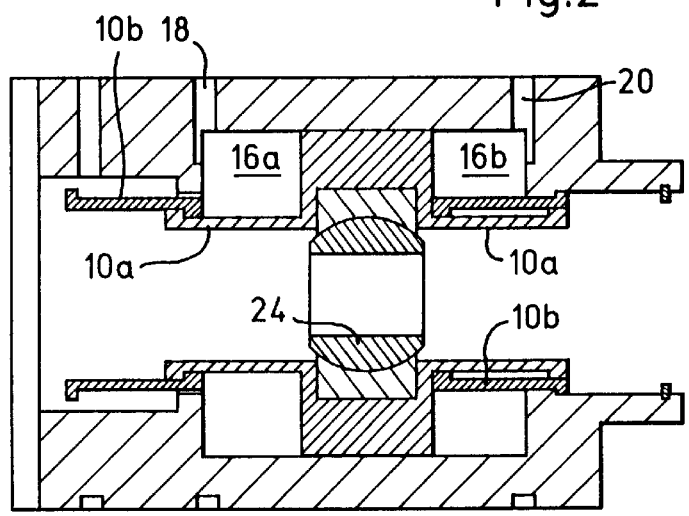
Figure 4:
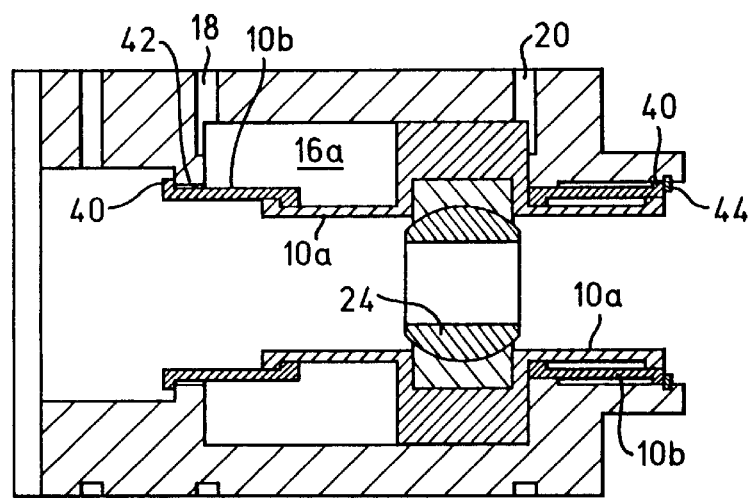

The full range of piston movement is shown in FIGS. 2 to 4 in which FIG. 2 showing the fully retracted position of the piston head 8a to the left of the cylinder 6, FIG. 3 shows the central position of the piston head 8a, and FIG. 4 shows the fully extended position of the control unit with piston head 8a to the right of the cylinder 6. It may be seen in FIG. 2 that the portions 10a, 10b to the left of the piston head are fully telescoped one upon the other, whereas the portions 10a, 10b to the right of the piston are fully extended in order to define the cavity 16 for application of fluid pressure. In the central position of FIG. 3, the fluid cavity 16 is disposed on either side of the piston head 8a and the telescopic portions 10a, 10b on both sides of the piston head 8a maybe wholly or partly retracted in order to define appropriate portions of cavity 16a and 16b. In FIG. 4, with the control unit 2 is fully extended, the shroud portions 10a, 10b to the right of the piston head are inoperative and are fully retracted, whereas the shroud portions 10a, 10b to the left of the piston head 8a are fully extended in order to define the cavity 16a to the left of the piston head 8a.

It may therefore be seen a significant saving is achieved in the length of the housing for the piston/cylinder unit, it being reduced by approximately the length of travel of the piston head.

In addition to the above-mentioned features the roller control unit 2 may be provided with a lubrication fluid supply arrangement for supplying lubrication to the rollers 28. A suitable arrangement may comprise a supply duct 50 for receiving hydraulic cooling fluid from source 22 and passing said fluid to a chamber 52 formed behind an end 54 of spindle 26. The spindle itself being provided with a large bore central coolant supply duct 56 having as large a diameter as possible so as to reduce fluid drag as it is passed therethrough. An outlet 57 is provided adjacent the roller 28 so as to direct coolant fluid at the roller surface. It will be appreciated that this arrangement will be able to provide cooling fluid to the roller regardless of the axial position of the control unit itself.

Figure 5:
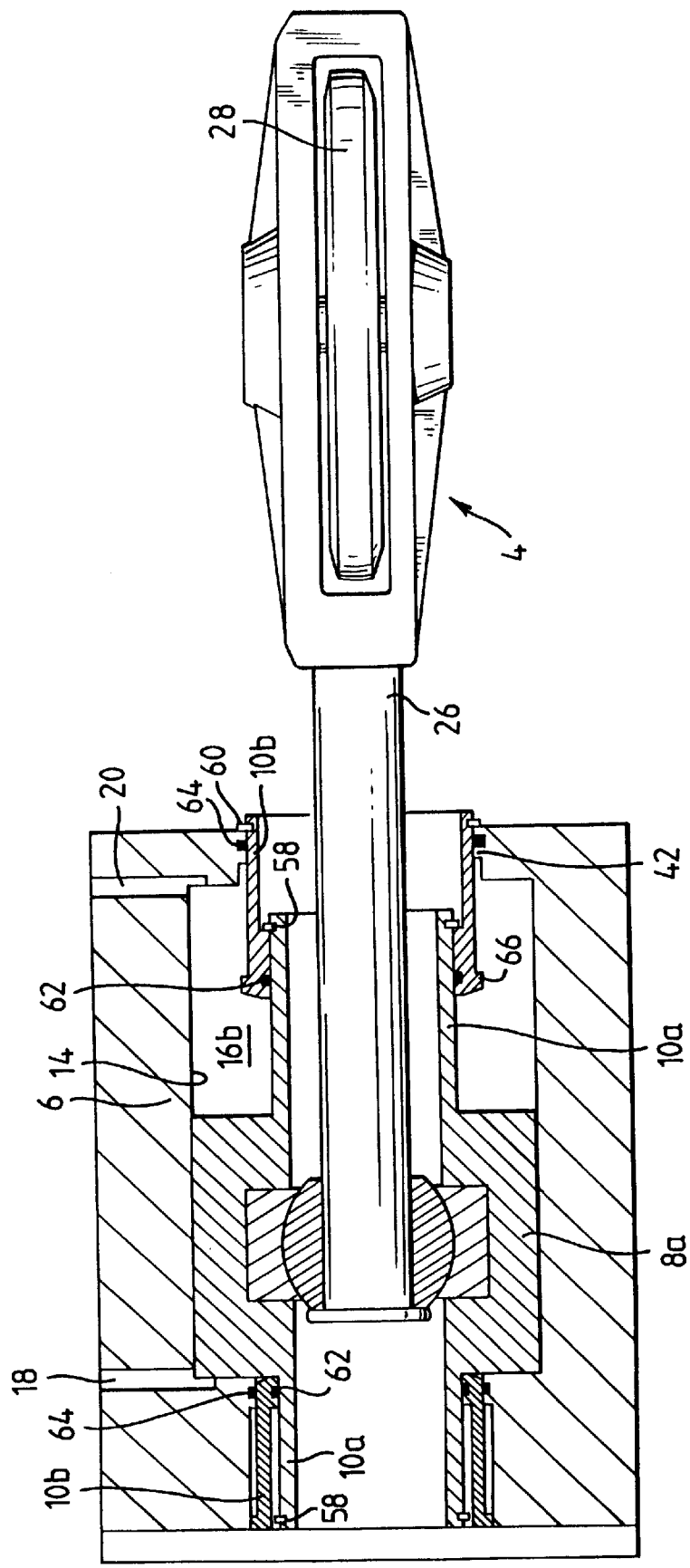
FIG. 5 is a cross-sectional view of an alternative form of the present invention.

Turning now to the alternative design of FIG. 5, it will be appreciated that the shrouds 10 and the endstop arrangements may be modified from that described above in order to facilitate easy assembly and/or possible disassembly for maintainance purposes. In this arrangement the shroud portions are modified by replacing bosses 36, 40 with simple circlips 58, 60 and providing seals 62, 64 on portions 10b and on a suitable part of the housing respectively. Assembly requires the component parts to be slid over each other before the circlips are inserted. Operation is much the same as described above save for the fact that the right hand portion 10b now slides into free space rather than into portion 46 and an additional endstop 66 on the right hand portion 10b engages with endstop 42 in order to prevent excessive travel in the direction of the roller 28.

It will be appreciated that the above mentioned invention could be applied to a single acting piston assembly in which hydraulic control fluid is supplied to just one side of the piston head 8a. In such an arrangement one would need but one shroud 10 and the other portion could be dispensed with. It will be further appreciated that the shroud as described herein may be replaced by a concertina section having suitable guide means to prevent collapse under the pressure of the hydraulic fluid.

It will also be appreciated that the above mentioned invention could be applied to a double acting piston assembly in which one side of the piston is provided with a shroud 10 as disclosed herein and the other side of the piston comprises an axially extending portion 9 as described with reference to the prior art of FIG. 1. Advantageously, such an arrangement would have the shroud 10 on the roller side of said piston assembly, thereby to minimise intrusion into the piston operating area.

What is claimed is:

1. A roller control unit for a continuously-variable-ration transmission of the toroidal-race rolling traction type, said roller control unit comprising:

A cylinder, having a cylinder wall and an end wall;

A piston, within the cylinder and to which the roller is connected for movement therewith, characterised by an axially extending shroud of variable length extending between the piston and the end wall, thereby to define in combination with the piston and cylinder a chamber for receiving hydraulic fluid, and in which the shroud comprises a telescopic shroud which in a first position of the piston is extended and in a second position of the piston is retracted.

2. A roller assembly as claimed in claim 1 in which the shroud comprises two or more axially extending tube sections, each section being slidable over the other between said first and second positions.

3. A roller control unit as claimed in claim 2 in which said tube sections include endstops for engagement with corresponding endstops on an adjacent telescopic portion when in said fully extended position.

4. A roller control unit as claimed in claim 2 in which a first of said telescopic portions comprises an extension of the piston.

5. A roller control unit as claimed in claim 2 in which a second of said telescopic portions has at an end remote from said first telescopic portion an end stop for engagement with an end stop fixed relative to the cylinder.

6. A roller control unit as claimed in claim 1 in which said cylinder includes an extension portion over which, in operation, said telescopic portion slides.

7. A roller control unit as claimed in claim 6 in which said end stop fixed relative to the cylinder comprises an end stop formed by or on said extension portion.

8. A roller control unit as claimed in claim 1 in which the piston comprises a double action piston and in which the assembly includes a second shroud member extending between the piston and a second end wall of the cylinder, thereby to define a second hydraulic chamber for receiving hydraulic fluid.

9. A roller control unit as claimed in claim 3 in which one or more of said end stops comprises a circlip.

* * * * *